United States Patent
Lin

(10) Patent No.: US 9,008,165 B2
(45) Date of Patent: Apr. 14, 2015

(54) DIGITAL PHASE EQUALIZER FOR SERIAL LINK RECEIVER AND METHOD THEREOF

(75) Inventor: Chi-Liang Lin, Fremont, CA (US)

(73) Assignee: Realtek Semiconductor Corp., Hsinchu (TW)

( * ) Notice: Subject to any disclaimer, the term of this patent is extended or adjusted under 35 U.S.C. 154(b) by 431 days.

(21) Appl. No.: 13/347,888

(22) Filed: Jan. 11, 2012

(65) Prior Publication Data

US 2013/0177063 A1 Jul. 11, 2013

(51) Int. Cl.
*H03H 7/30* (2006.01)
*H04L 25/03* (2006.01)

(52) U.S. Cl.
CPC .................. *H04L 25/03012* (2013.01)

(58) Field of Classification Search
CPC ............................ H03K 23/00; H04L 25/03057
USPC .......................................................... 375/229
See application file for complete search history.

(56) References Cited

U.S. PATENT DOCUMENTS

| | | | |
|---|---|---|---|
| 6,292,507 B1 * | 9/2001 | Hardin et al. ................. | 375/130 |
| 6,389,548 B1 * | 5/2002 | Bowles .......................... | 713/500 |
| 7,489,739 B2 * | 2/2009 | Dally ............................ | 375/316 |
| 7,965,801 B1 * | 6/2011 | O'Reilly et al. .............. | 375/355 |

\* cited by examiner

*Primary Examiner* — Lihong Yu
(74) *Attorney, Agent, or Firm* — McClure, Qualey & Rodack, LLP

(57) ABSTRACT

An apparatus of automatic power control for burst mode laser transmitter and method are provided. In one implementation a method includes: pushing a first multi-bit data into a data memory; modifying the data memory to remove a condition of frequent transition in the data memory, if the condition of frequent transition is found; establishing a list of indices pointing to data transition of the data memory; and sequentially examining a respective run length of the data indexed by each entry in the list, modifying the associated data to lengthen the respective run length if the respective run length is too short, modifying the associated data to shorten the respective run length if the respective run length is too long, and outputting a second multi-bit data by taking data from the data memory.

20 Claims, 6 Drawing Sheets

DIGITAL PHASE EQUALIZER FOR SERIAL LINK RECEIVER AND METHOD THEREOF

FIELD OF TECHNOLOGY

This disclosure relates to digital phase equalizer for a serial link receiver.

BACKGROUND

Serial links are used in many applications, for example, optical communications. As depicted in FIG. 1, a prior art serial sink 100 comprises a transmitter 110, a transmission medium 120, and a receiver 130. The transmitter 110 transmits onto a first end 121 of the transmission medium 120 a first signal S1 using a two-level signaling scheme to represent a first serial binary data stream D1 timed in accordance with a first clock CLK1. The first signal S1 traverses along the transmission medium 120 and evolves into a second signal S2 as it reaches at a second end 122 of the transmission medium 120. The second signal S2, which is a continuous-time signal, is received by the receiver 130 at the second end 122 of the transmission medium 120. The receiver comprises: an equalizer 132 for receiving the second signal S2 and outputting a third signal S3, and a CDR (clock data recovery) apparatus 131 for generating a second clock CLK2 by extracting a timing embedded in third signal S3 and for using the second clock CLK 2 to sample the second signal S3 to generate a second serial binary data stream D2. When the CDR apparatus 131 functions correctly, the second serial binary data stream D2 will substantially match the first serial binary D1, except for a delay. The purpose of equalizer 132 is to correct a distortion of the second signal S2 due to dispersion of the transmission medium 120.

An exemplary waveform of the first signal S1, the second signal S2, and the third signal S3 are shown in FIG. 2. The first signal S1 is a typical NRZ (non-return-to-zero) waveform that is either of a first level (1) or a second level (−1), representing either a binary "1" or a binary "0" data, respectively. Due to distortion of the transmission medium 120, the second signal S2 is distorted and thus quite different from the first signal; in particular, it fails to reach the full level when the first signal S1 undergoes a consecutive sign change, as illustrated by the difference in waveform between 201 and 202. The equalizer 132 is used to correct the distortion, so that the third signal S3 can be more like the first signal S1, as illustrated by the similarity between 203 and 201. Equalizer 132, however, is an analog circuit that is susceptible to variation due to manufacturing process, temperature, and supply voltage of the circuit.

What is disclosed is a method and apparatus of a digital equalizer for correcting a distortion due to dispersion of the transmission medium.

SUMMARY

In an embodiment, an apparatus comprises: a serial-to-parallel over-sampler for receiving a continuous-time signal and outputting a first multi-bit data, and an equalizer for receiving the first multi-bit data and outputting a second multi-bit data, wherein the equalizer comprises a data memory for storing the multi-bit data, a transition memory for storing indices of data transition, and the following functional blocks: input interface for storing the multi-bit data into the data memory; bubble removal for modifying the data memory to remove a condition of frequent data transition if found; transition detection for detecting a data transition in the data memory and storing an index of the data transition into the transition memory; run-length detection for detecting a respective run length associated with each data transition; a run-length correction for modifying the data memory for either lengthening a short run of data or shortening a long run of data; and output interface for outputting the second multi-bit data from the data memory.

In an embodiment, a method comprises: receiving a continuous-time input signal; sampling the continuous-time signal at a sampling rate higher than a data rate embedded in the continuous-time input signal to generate a first multi-bit data; pushing the first multi-bit data into a data memory; modifying the data memory to remove a condition of frequent transition in the data memory, if the condition of frequent transition is found; establishing a list of indices pointing to data transition of the data memory; and sequentially examining a respective run length of the data indexed by each entry in the list, modifying associated data to lengthen the respective run length if the respective run length is too short, modifying the associated data to shorten the respective run length if the respective run length is too long, and outputting a second multi-bit data by taking data from the data memory.

DETAILED DESCRIPTION

The following detailed description refers to the accompanying drawings which show, by way of illustration, various embodiments in which the invention may be practiced. These embodiments are described in sufficient detail to enable those skilled in the art to practice these and other embodiments. The various embodiments are not necessarily mutually exclusive, as some embodiments can be combined with one or more other embodiments to form new embodiments. The following detailed description is, therefore, not to be taken in a limiting sense.

Figure 1:
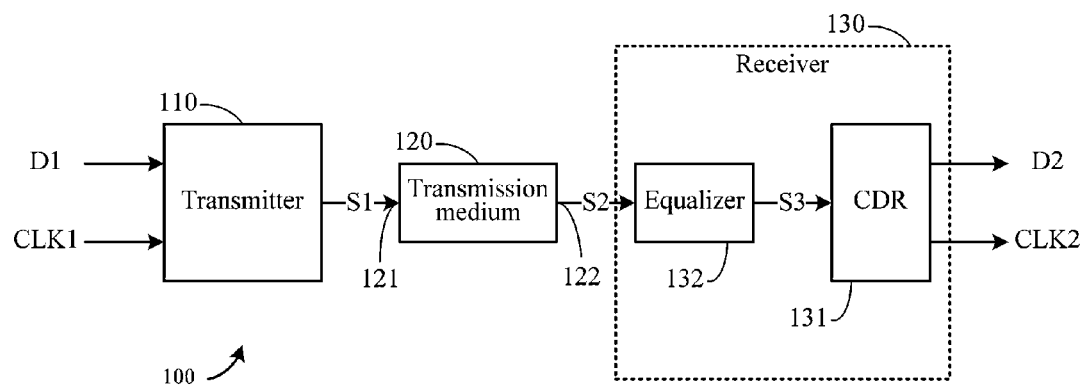
FIG. 1 shows a functional block diagram of a serial link.
Figure 2:
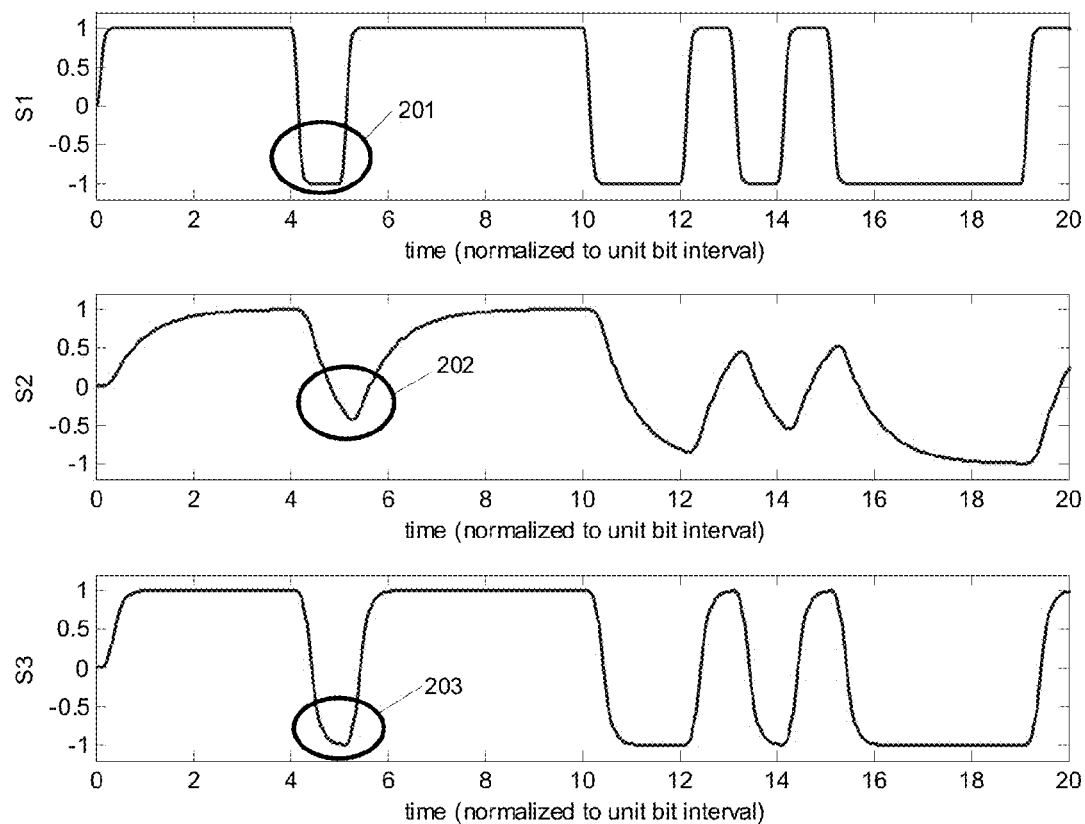
FIG. 2 shows exemplary waveforms of the serial link of FIG. 1.
Figure 3:
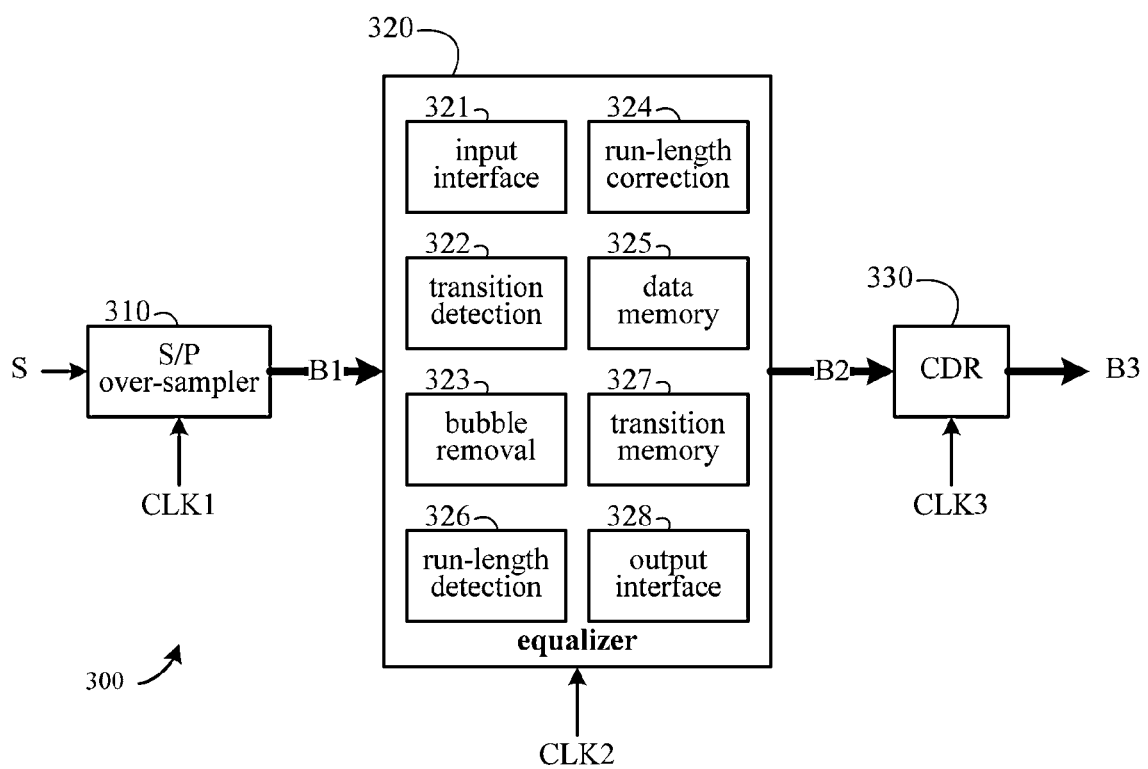
FIG. 3 shows en embodiment of a serial link receiver in accordance with the present invention.

The digital equalizer disclosed in the present invention is based on over-sampling a continuous-time input signal carrying a serial data stream. Over-sampling in a serial link receiver is defined as sampling the continuous-time input signal at a sampling rate higher than a data rate of the serial data stream embedded in the continuous-time signal; an over-sampling ratio is defined as the ratio between the sampling rate and the data rate of the serial data stream. For a receiver of a serial link of one Gigabit per second, for instance, an over-sampling ratio of five is used when sampling the continuous-time input signal at a rate of five Giga-samples per second. A functional block diagram of a serial link receiver 300 using an equalizer in accordance with an embodiment of the present invention is depicted in FIG. 3. Serial link receiver 300 comprises: a serial-to-parallel (S/P) over-sampler 310 for receiving a continuous-time input signal S and outputting a first multi-bit data B1 in accordance with a timing of a first clock CLK1; an equalizer 320 for receiving the first multi-bit data B1 and outputting a second multi-bit data B2 in accordance with a timing of a second clock CLK2; and a CDR (clock-data recovery) unit 330 for receiving the second multi-bit data B2 and outputting a third multi-bit data B3 in accordance with a timing of a third clock CLK3. Detailed descriptions of the serial link receiver 300 are given in the following paragraphs.

Figure 4A:
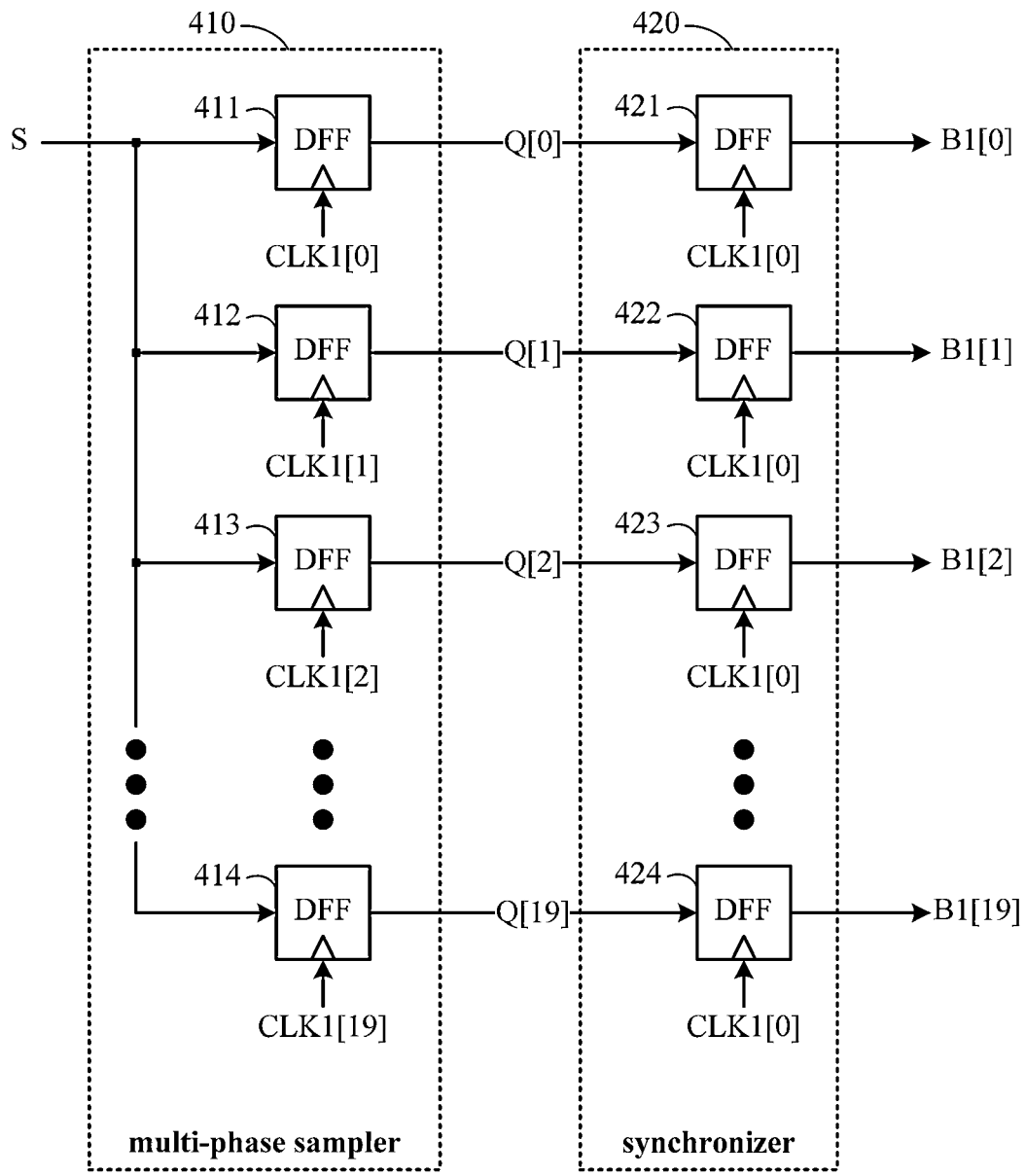
FIG. 4A shows an embodiment of S/P over-sampler suitable for the serial link receiver of FIG. 3.

S/P over-sampler 310 converts the continuous-time input signal S into the first data B1 in accordance with the timing of the first clock CLK1. An embodiment 400 suitable for embodying S/P over-sampler 310 of FIG. 3 is depicted in FIG. 4A. Embodiment 400 comprises a multi-phase sampler 410 and a synchronizer 420. A plurality of phases of the first clock CLK1 is used for the multi-phase sampler 410. By way of example but not limitation, an over-sampling ratio of five is employed and twenty phases of CLK1, labeled as CLK1 [0], CLK[1], CLK[2], ..., CLK[19], are used in embodiment 410. The multi-phase sampler 410 samples the continuous-time input signal S using twenty DFF (data flip flop) 411, 412, 413, ..., 414 in accordance with CLK1[0], CLK1[1], CLK1 [2], ..., CLK1[19], respectively, resulting in twenty bits Q[0], Q[1], Q[2], ..., Q[19], respectively. The synchronizer 420 synchronizes the timings of the twenty bits Q[0], Q[1], Q[2], ..., Q[19] using another twenty DFF 421, 422, 423, ..., 424 in accordance with one of the twenty clock phases of CLK1, in this example CLK1[0], resulting in the first multi-bit data B1 comprising twenty bits, i.e. B1[0], B1[1], B1[2], ..., B[19]. In this manner, the continuous-time input signal S is converted into a block of multi-bit data B1, in this example a block of twenty bits.

Figure 4B:
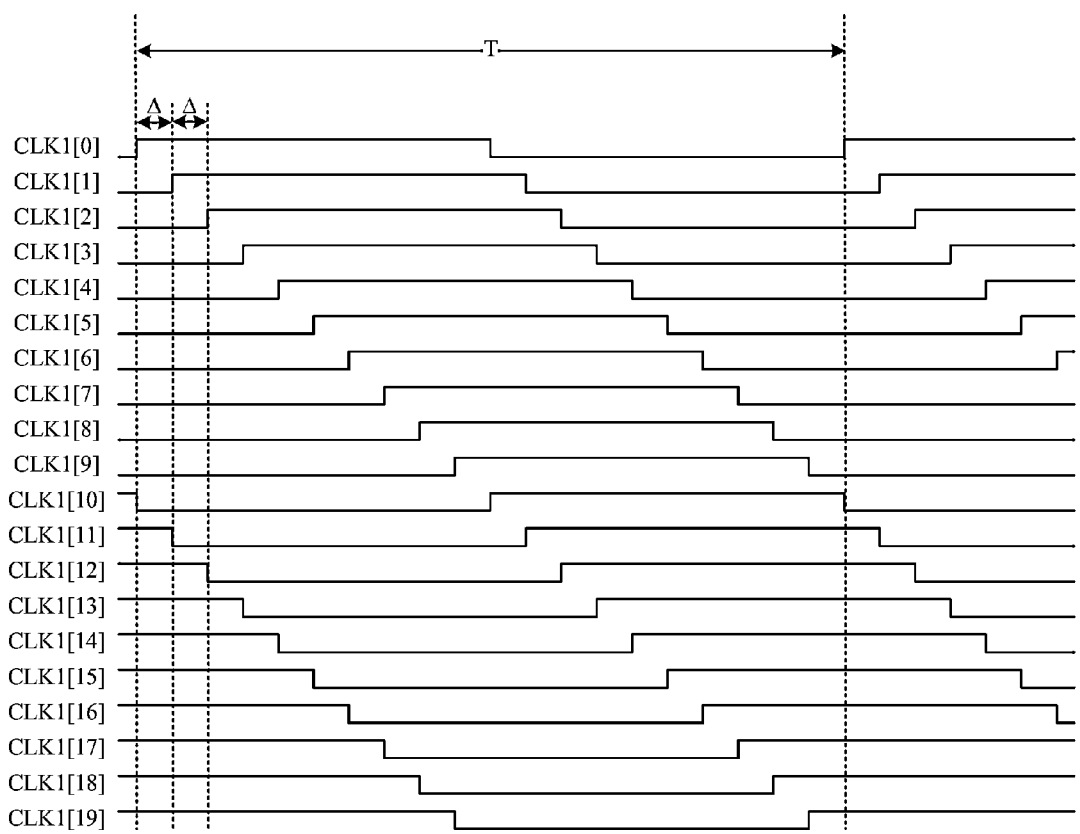
FIG. 4B shows an exemplary timing diagram for the S/P over-sampler shown in FIG. 4A.

An exemplary timing diagram of CLK1 is shown in FIG. 4B. A period of the first clock CLK1 is T. The twenty phases CLK1[0], CLK1[1], CLK1[2], ..., CLK1[19] are uniformly displaced in time, with a spacing of Δ in time between adjacent phases, where Δ=T/20. In this example of using an over-sampling ratio of five, a unit interval of the binary data stream carried in the continuous-time input signal S is five times of the spacing Δ (i.e. 5·Δ), therefore five samples are generated for every bit of the binary data stream. On the other hand, each block of the twenty-bit data B1 covers four bits of the data stream embedded in the continuous-time input signal S.

Equalizer 320 receives the first multi-bit data B1 and outputs the second multi-bit data B2 in accordance with a timing of a second clock CLK2. Equalizer 320 comprises the following functional units: input interface 321, transition detection 322, bubble removal 323, run-length detection 326, run-length correction 324, and output interface 328. Equalizer 320 also includes a data memory 325 for storing data, and a transition memory 327 for storing indices of data transition. The above mentioned example, wherein the first multi-bit data B1 is a twenty-bit data resulting from a five-time over-sampling of the continuous-time input signal S, is used to explain these functions in the following paragraphs.

When the equalizer 320 receives the first multi-bit data B1, it stores the multi-bit data B1 into the data memory 325, overwriting the previous values stored in the data memory. By way of example but not limitation, in one embodiment, CLK1 is the same as CLK2, B1 is a twenty-bit data and a forty-bit memory denoted as M[39:0] is used to embody the data memory 325, and the input interface function 321 is described in an algorithm written in C-language shown below:

```
for (j=0; j<20; j++) {
    M[j] = M[j+20];
    M[j+20] = B1[j];
}
```

That is: the latest twenty bits stored in the data memory are moved to the second-to-latest twenty bits; the twenty-bit data B1[19:0] are stored into the latest twenty bits of the data memory.

Note that the above algorithm is only meant to illustrate the function of input interface 321 and intended for ease of explanation instead of efficiency in embodiment; those of ordinary skills in the art are free to implement the function using whatever algorithm that is applicable, as long as the function is preserved. For instance, one may choose to use two pages of twenty-bit memories, and alternately store the multi-bit data B1[19:0] into one of the two memories without physically moving the latest twenty bits of the data memory.

Figure 5A:
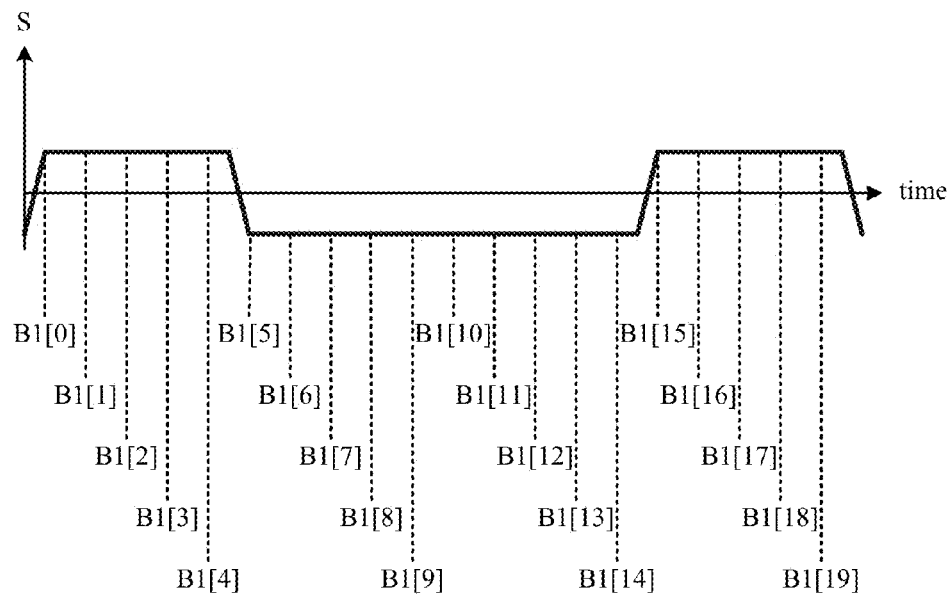
FIG. 5A shows an exemplary ideal waveform for the S/P over-sampler shown in FIG. 4A.

The binary data stream embedded in the continuous-time input signal S is either binary one ("1") or binary zero ("0"). If there is no distortion in the continuous-time input signal S, each "1" bit will result in five consecutive "1" bits in the twenty-bit data B1 due to using five-time over-sampling. Likewise each "0" bit will result in five consecutive "0" bits in the twenty-bit data B1. An exemplary ideal waveform of the continuous-time input signal S and the corresponding twenty-bit data B1 are shown in FIG. 5A; there are five consecutive "1" bits B1[4:0], followed by ten consecutive "0" bits B1[14:5], followed by five consecutive "0" bits. A run of five consecutive "1" bits is said to have a run-length of five. Likewise, a run of ten consecutive "0" bits is said to have a run-length of ten. If there is no distortion in the continuous-time input signal S, the run-length of either "1" or "0" bits in the data obtained from a five-time over-sampling will always be a multiple of five, i.e. five, ten, fifteen, twenty, and so on.

Due to a distortion, the run-length of the data obtained from the five-time over-sampling may not be exactly a multiple of five. Whenever a run of "1" ends, a transition occurs as the next sample will be "0," thus ending the run of "1." Likewise, whenever a run of "0" ends, a transition occurs as the next sample will be "1," thus ending the run of "0." The transition detection function 322 tests if two adjacent bits of the multi-bit data B1 are different, and a transition is detected whenever the two adjacent bits are different. Note that for the first bit B1[0], the XOR operation must be applied with the last bit B1[19] from the previous sampling period of the first clock CLK1. For this reason, a previous value of the last bit B1[19] must be saved; that's why the size of the data memory 325 must be larger than the size of the multi-bit data B1 so as to be able to at least partly save the old twenty-bit data B1 from the previous sampling period (of the first clock CLK1) when the new twenty-bit data B1 from the present sampling period (of the first clock CLK1) are saved into the data memory 325.

In one embodiment, transition detection function 322 comprises a plurality of hard-wired XOR gates for effectively embodying the following algorithm written in C-language:

```
for (j=19; j<40; j++)
    X[j] = M[j] ^ M[j-1];
```

Here, X[j] is referred to as a transition signal; if X[j] is 1, it indicates at transition occurs from M[j 1] to M[j].

Figure 5B:
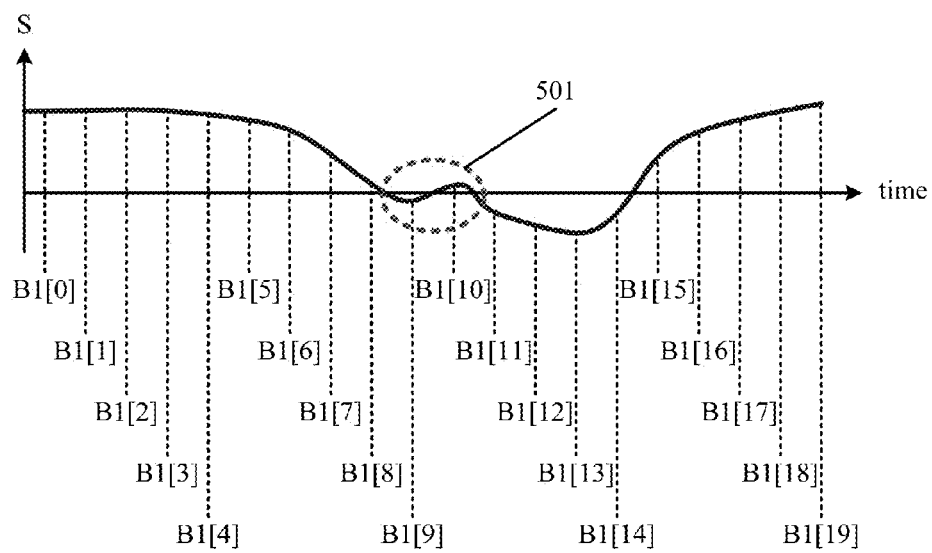
FIG. 5B shows an exemplary actual waveform for the S/P over-sampler shown in FIG. 4A.

Under certain circumstances (for instance, in the presence of distortion and/or additive noise), the transition may occur too often resulting in a "bubble" within the twenty-bit data B1. For five-time over-sampling, a bubble is found when there exist more than two transitions within five consecutive samples. A bubble condition 501 is shown in FIG. 5B, wherein there are two consecutive transitions resulting in M[20:39]=11111111101000011111. In this case, in an embodiment the bubble removal function 323 will remove the bubble by treating the second transition of the three consecutive transitions as invalid and change the data to M[20:39]= 11111111100000011111. An algorithm written in C-language for embodying the bubble removal function 323 is shown below:

```
for (j=20; j<38; j++) {
    if (~X[j-1] & X[j] & X[j+1])
        M[j+1] = M[j];
}
```

An algorithm written in C-language suitable for embodying run-length detection function 326 is shown below:

```
Transition[0] = Transition[k] - 20;
k = 0;
for (j=20; j<40; j++){
    if (X[j]==1)
        k++;
        Transition[k] = j;
}
```

Here, Transition is an array for storing the indices of bits where a transition occurs;

k is a variable storing a count of transitions. The last transition in last sampling period (of the first clock CLK1) is carried over to the present sampling period in order to calculate the run length of the last transition. Because the last transition occurs in a previous sampling period (of the first clock CLK1), the value must be decremented by 20, the number of bits in one sampling period (of the first clock CLK1). When a transition is detected, k is incremented and the index of the bit where the transition occurs is stored into the Transition array.

In the exemplary embodiment of five-time over-sampling, ideally every run-length of consecutive "1" or "0" must be a multiple of five. Due to dispersion of the transmission medium, a run length may deviate from a multiple of five. In particular, there are two scenarios that are common:

Scenario 1: Short Run Length

A run length shorter than four needed to be made longer.

If a run-length of one is detected, for instance M[39:20]=00000000001000000000, in an embodiment, M[39:20] is changed to 00000000111110000000.

If a run-length of two is detected, for instance M[39:20]=00000000011000000000, in an embodiment, M[39:20] is changed to 00000000111100000000.

If a run-length of three is detected, for instance M[39:20]=00000000111000000000, in an embodiment, M[39:20] is changed to 00000001111100000000.

Scenario 2: Long Run Length

A long run length, for instance, longer than fifteen, needed to be made shorter.

For instance, if M[39:0]= 11110000000000000000000000000000000000000, in an example, M[39:0] is changed to M[39:0]= 11111000000000000000000000000000000000000.

An algorithm written in C-language suitable for embodying run-length correction function 324 is shown below:

```
for (n=0; n<k; n++) {
    Run_length = Transition[n+1] - Transition[n];
    if Run_Length==1 {
        M[Transition[n]-1] = M[Transition[n]];
        M[Transition[n]-2] = M[Transition[n]];
        M[Transition[n+1]] = M[Transition[n+1] -1];
        M[Transition[n+1]+1] = M[Transition[n+1] -1];}
    elseif Run_Length<4 {
        M[Transition[n]-1] = M[Transition[n]];
        M[Transition[n+1]] = M[Transition[n+1] -1];
    elseif Run_Length>15 {
        M[Transition[n+1]-1] = M[Transition[n+1]];
    }
}
```

Note that the criterion of "long run length" depends on the dispersion of the transmission medium used in the serial link. The above algorithm is just an example workable for a certain transmission medium and may not work well for other transition media. In general, if the transmission medium is more dispersive, the criterion for "long run length" is looser (i.e., a shorter run length is qualified as a long run length).

Output interface 328 is to provide the subsequent CDR 330 to access the data memory 325 so as to obtain the second multi-bit data B2 (see FIG. 3). In one embodiment where CLK3 is the same as CLK2 and B2 is of the same dimension as B1, the output interface function 328 is described in an algorithm written in C-language shown below:

```
for (j=0; j<20; j++){
    B2[j] = M[j];
}
```

If CLK3 is different from CLK2, an elastic buffer is needed for the output interface 328. The principle of elastic buffer is well known to those of ordinary skill in the art and thus not described in detail here.

Clock-data-recovery is a function well known in prior art. CDR 330 can be embodied by any embodiment known in prior art and not described in detail here.

Although specific embodiments have been illustrated and described herein, it will be appreciated by those of ordinary skill in the art that any arrangement that is calculated to achieve the same purpose may be substituted for the specific embodiments shown. This application is intended to cover adaptations and variations of the embodiments discussed herein. Various embodiments use permutations and/or combinations of embodiments described herein. It is to be understood that the above description is intended to be illustrative, and not restrictive, and that the phraseology or terminology employed herein is for the purpose of description.

What is claimed is:

1. An apparatus for equalizing a continuous-time signal comprising:
   a serial-to-parallel over-sampler configured to receive the continuous-time signal and output a first multi-bit data, and
   an equalizer, coupled to the serial-to-parallel over-sampler, configured to:
   receive the first multi-bit data;
   detect and remove a condition of bubble transition in the first multi-bit data to produce a modified multi-bit data, wherein a bubble transition is defined by more than two transitions within consecutive samples of a sample length that is proportional to an oversampling ratio of the
serial-to-parallel over-sampler;
establish a list of indices pointing to locations of data
transitions in the modified multi-bit data;
sequentially examine a respective run length of the data
indexed by each entry in the list;
modify associated data to lengthen the run length in
response to a determination that the run length is too
short and to shorten the run length in response to a
determination that the run length is too long; and
output a second multi-bit data.

2. The apparatus of claim 1, wherein the equalizer comprises a data memory, a transition memory, an input interface, logic for bubble removal, logic for transition detection; logic for run-length detection; logic for run-length correction; and an output interface.

3. The apparatus of claim 1, wherein the serial-to-parallel over-sampler comprises:
a multi-phase sampler for using a multi-phase clock comprising a plurality of uniformly distributed phases for sampling the continuous-time signal, resulting in a plurality of intermediate data bits, respectively; and
a synchronizer for using a phase of the multi-phase clock for sampling said intermediate data bits to generate the first multi-bit data.

4. The apparatus of claim 2, wherein the input interface pushes the first multi-bit data into a latest portion of the data memory.

5. The apparatus of claim 2, wherein the logic for bubble removal modifies the data memory to remove a condition of frequent data transition.

6. The apparatus of claim 2, wherein the logic for transition detection detects a data transition in the data memory, stores an index of the data transition into the transition memory, and maintains a count of the data transitions being found.

7. The apparatus of claim 2, wherein the logic for run length detection detects a respective run length associated with each entry maintained in the transition memory.

8. The apparatus of claim 2, wherein the logic for run length correction modifies the data memory to lengthen a run length if a short run length is found.

9. The apparatus of claim 2, wherein the logic for run length correction modifies the data memory to shorten a run length if a long run length is found.

10. The apparatus of claim 2, wherein the output interface generates the second multi-bit data by taking data from the data memory.

11. The apparatus of claim 1, wherein the over sampling ratio comprises a sampling rate of the serial-to-parallel over-sampler that is five-times higher than a data rate associated with the continuous-time signal.

12. A method for equalizing a continuous-time signal comprising:
receiving the continuous-time signal;
sampling the continuous-time signal at a sampling rate higher than a data rate embedded in the continuous-time signal to generate a first multi-bit data;
detecting and removing a condition of bubble transition in the first multi-bit data to produce a modified multi-bit data, wherein a bubble transition is defined by more than two transitions within consecutive samples of a sample length that is proportional to an oversampling ratio corresponding to the higher sampling rate;
establishing a list of indices pointing to locations of data transitions in the modified multi-bit data;
sequentially examining a respective run length of the data indexed by each entry in the list;
modifying associated data to lengthen the run length in response to a determination that the run length is too short and to shorten the run length in response to a determination that the run length is too long; and
outputting a second multi-bit data.

13. The method of claim 12, wherein the step of sampling the continuous-time signal comprises:
sampling the continuous-time signal using a multi-phase clock comprising a plurality of phases to generate a plurality of intermediate data bits, respectively, and
sampling said intermediate data bits using a phase of the multi-phase clock to generate the first multi-bit data.

14. The method of claim 12, further comprising:
pushing the first multi-bit data into a data memory.

15. The method of claim 14, wherein the step of pushing further comprises:
moving a data of a latest block of the data memory into a second-to-latest block of the data memory, and
storing the first multi-bit data into the latest block of the data memory.

16. The method of claim 12, wherein the condition of frequent transition is a condition where more than two transitions occurs during a time span equal to a unit interval of data embedded in the continuous-time signal.

17. The method of claim 12, wherein the condition of frequent transition is removed by toggling a value of a data bit that causes the condition of frequent transition.

18. The method of claim 12, wherein the step of establishing the list of indices further comprises:
sequentially examining if two adjacent bits in a data memory are identical;
if the two adjacent bits are different, incrementing a count of transition.

19. The method of claim 12, wherein the run length associated with each transition is a difference between a value of an entry of a transition memory and a value of a preceding entry of the transition memory.

20. The method of claim 12, wherein the run length is determined to be too short responsive to determining that the run length is smaller than a ratio between the sampling rate and the data rate embedded in the continuous-time signal by more than one.

* * * * *